United States Patent
Vitenberg (10) Patent No.: US 6,813,343 B1
(45) Date of Patent: Nov. 2, 2004

(54) METHOD AND APPARATUS FOR FILTERING ASYMMETRIC DIGITAL SUBSCRIBER LINE (ADSL) SIGNALS

(75) Inventor: Roman Vitenberg, Holon (IL)

(73) Assignee: Orckitt Communications Ltd., Tel Aviv (IL)

( * ) Notice: Subject to any disclaimer, the term of this patent is extended or adjusted under 35 U.S.C. 154(b) by 0 days.

(21) Appl. No.: 09/310,518

(22) Filed: May 12, 1999

(51) Int. Cl.[7] .............................................. H04M 11/06
(52) U.S. Cl. ................ 379/93.05; 379/377; 379/387.01
(58) Field of Search ........................... 379/93.05, 93.06, 379/93.07, 177

(56) References Cited

U.S. PATENT DOCUMENTS

| | | | | |
|---|---|---|---|---|
| 2,924,667 A | * | 2/1960 | Hochgraf | 379/179 |
| 3,881,068 A | * | 4/1975 | Jones et al. | 379/177 |
| 5,832,077 A | * | 11/1998 | Ciurpita | 379/388.01 |
| 6,115,466 A | * | 9/2000 | Bella | 379/399.01 |
| 6,181,777 B1 | | 1/2001 | Kiko | 379/32.04 |

* cited by examiner

Primary Examiner—Minsun Oh Harvey
Assistant Examiner—Daniel Swerdlow
(74) Attorney, Agent, or Firm—Darby & Darby (57) ABSTRACT

A method and apparatus for selectively filtering signals on a digital subscriber line (DSL) so as to prevent interference resulting from a telephone instrument switching between its on-hook and off-hook states. One embodiment of the invention utilizes an off-hook detector controlling a variable attenuator element. Another embodiment of the invention uses a switch in parallel with a resistive element to implement the variable attenuator element. Yet another embodiment has an inductive element with a saturable core for providing attenuation to compensate for inconsistencies that result from the changing hookswitch status of a telephone instrument.

6 Claims, 10 Drawing Sheets

METHOD AND APPARATUS FOR FILTERING ASYMMETRIC DIGITAL SUBSCRIBER LINE (ADSL) SIGNALS

FIELD OF THE INVENTION

The present invention relates generally to data and voice communications over digital subscriber lines and, more particularly, to a method and apparatus for filtering signals in a splitterless asymmetric digital subscriber line (ADSL) system.

BACKGROUND OF THE INVENTION

Asymmetric Digital Subscriber Line (ADSL) refers to a new modem technology that allows existing twisted pair telephone lines to be converted into a high-performance access path for multimedia and high-speed data communications. An ADSL circuit connects an ADSL modem on each end of the twisted pair telephone line, creating three information channels—a high speed downstream (central office to end user) channel, a medium speed upstream (end user to central office) channel, and a POTS ("Plain Old Telephone Service") channel. The POTS channel is separated from the ADSL modem by filters, thus guaranteeing uninterrupted POTS, even if the ADSL circuit fails.

While description is provided in terms of the POTS channel, telephone voice communications signals, telephone instruments, and the like for the benefit of familiarity, it should be understood that telephone equipment and signals need not be limited to voice communications, but may also include other technologies, for example equipment and signals compatible with regular telephone lines, such as facsimiles machines, voiceband modems (for example, V.90 modems), answering machines, and the like.

Two variants of ADSL systems are available today—full-rate ADSL in accordance with the T1E1.413 or ITU G.992.1 standards and "splitterless" ADSL defined by the ITU G.992.2 standard. Full-rate ADSL uses POTS splitters to separate the POTS channel from the ADSL data signals. A POTS splitter is installed at each end of the line and includes a lowpass filter for separating out POTS telephone voice communication signals and a highpass filter for separating out data communication signals.

The POTS splitter divides the subscriber line into two separate twisted pairs—one for data communication (ADSL) and one for telephone voice communication signals (POTS). As a result, the existing two-wire internal house telephone wiring is not usable for ADSL. New wiring must be installed from the splitter to the modem, resulting in increased installation cost.

Splitterless ADSL can be installed without the need for additional home wiring. In this case, the ADSL modem includes a high-pass filter that rejects the POTS telephone voice communication signal, while every telephone instrument in the house is connected to the telephone line through a low-pass filter that rejects the ADSL data signals.

When only one telephone instrument is used, the well-known design of LC filters is adequate to implement the required low pass filter. However, in real life, several telephone instruments are usually connected to each telephone line, each of them in an on-hook or off-hook state. In "splitterless" ADSL, the result of such a configuration is that several lowpass filters are connected in parallel on the same telephone line. Certain electrical properties of a telephone instrument, for example its input impedance, depends on the operational state or hookswitch condition (e.g., whether the telephone instrument hookswitch is on-hook or off-hook). Hookswitch condition can refer to the on-hook or off-hook states of the hookswitch or the transitions of the hookswitch between these states. As a result, certain filter characteristics, for example the frequency response, of a low pass filter connected to a telephone instrument will change when the telephone changes its state.

In reality, the behavior is much more complicated. A low pass filter connected to an on-hook telephone has zero impedance at 4 kHz, which will produce distortion in another telephone instrument, should it happen to be off-hook. Several on-hook telephones connected in parallel will create several resonance frequencies (Universal ADSL Technical Group Contribution, Document # [TG/98-121]; "Preliminary Report of the POTS Filter and Power Reduction Ad-hoc;" Bob Beeman; Redmond, Wash.; Apr. 14, 1998; pp. 1–9).

Figure 1:
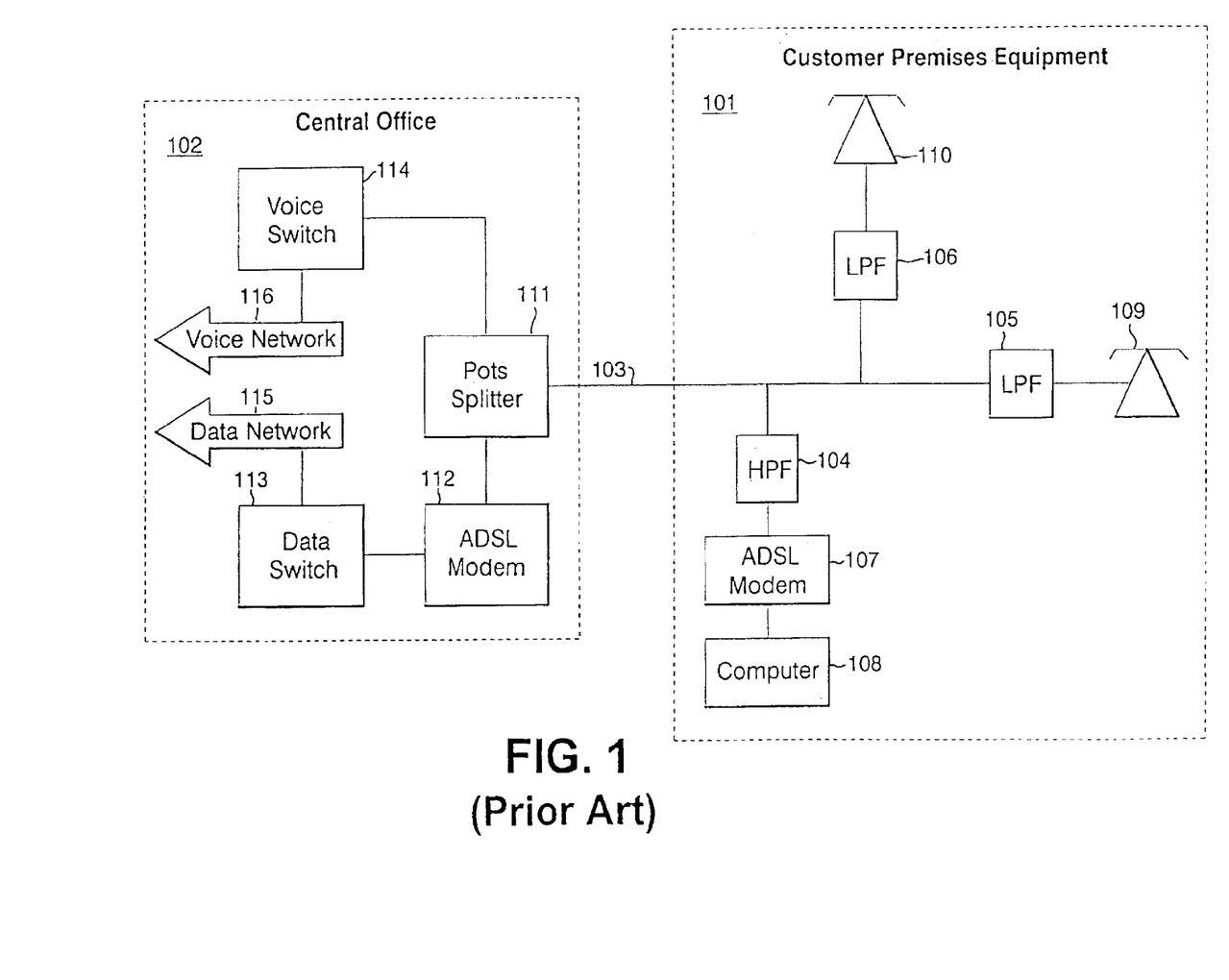
FIG. 1 is a block diagram illustrating a splitterless ADSL system of the prior art.

FIG. 1 is a block diagram illustrating a splitterless ADSL system of the prior art. Customer premises equipment (CPE) 101 is coupled to central office (CO) 102 by digital subscriber line (DSL) 103. CPE 101 includes a highpass filter 104, ADSL modem 107, computer 108, lowpass filters 105 and 106, and telephone instruments 109 and 110. Computer 108 is coupled to ADSL modem 107, which is coupled to highpass filter 104, which is coupled to DSL 103. Telephone instrument 109 is coupled to lowpass filter 105, which is coupled to DSL 103. Telephone instrument 110 is coupled to lowpass filter 106, which is coupled to DSL 103.

CO 102 includes a POTS ("plain old telephone service") splitter 111, ADSL modem 112, data switch 113, voice switch 114, data network 115, and voice network 116. DSL 103 is coupled to POTS splitter 111, which is coupled to voice switch 114 and ADSL modem 112. Voice switch 114 is coupled to voice network 116. ADSL modem 112 is coupled to data switch 113, which is coupled to data network 115.

Voice communications passing through voice switch 114 are passed through POTS splitter 111 and applied to DSL 103 as baseband signals. Data communications passing through data switch 113 are modulated at a frequency range higher than that of the baseband POTS signals and passed through POTS splitter 111 and applied to DSL 103. Since the data communications are transmitted at a different frequency range than the voice communications, frequency-division-multiplexing (FDM) allows simultaneous transmission of both voice communications (POTS) and data communications over a single DSL 103.

Since data communications are suitably processed by ADSL modem 107 and computer 108, while voice communications are intended for telephone instruments 109 and 110, highpass filter 104 and lowpass filters 105 and 106 provide selective filtering of the voice and data communications. Highpass filter 104 passes the higher frequency data communications to ADSL modem 107 and computer 108, while blocking the lower frequency baseband voice communications. Lowpass filters 105 and 106 pass the lower frequency baseband voice communications to telephone instruments 109 and 110, respectively, while blocking the higher frequency data communications.

Unfortunately, lowpass filters 105 and 106 exhibit a deficiency that can adversely affect the performance of the ADSL system. The frequency response of lowpass filters 105 and 106 changes based on the status of telephone instruments 109 and 110, respectively. For example, while lowpass filter 105 might properly differentiate between voice communications and data communications when telephone instrument 109 is off-hook (e.g, when telephone instrument 109 is in use), the electrical characteristics of lowpass filter 105 are altered when telephone instrument 109 is returned to its on-hook state (e.g., when the user hangs up). This change in the electrical characteristics of lowpass filter 105 can cause interference with the data communications between ADSL modem 107 of CPE 101 and ADSL modem 112 of CO 102. Thus, a circuit is needed that will allow telephone instruments, such as telephone instruments 109 and 110, to change between their off-hook and on-hook states without adversely affecting ongoing data communications over DSL 103.

Figure 2:
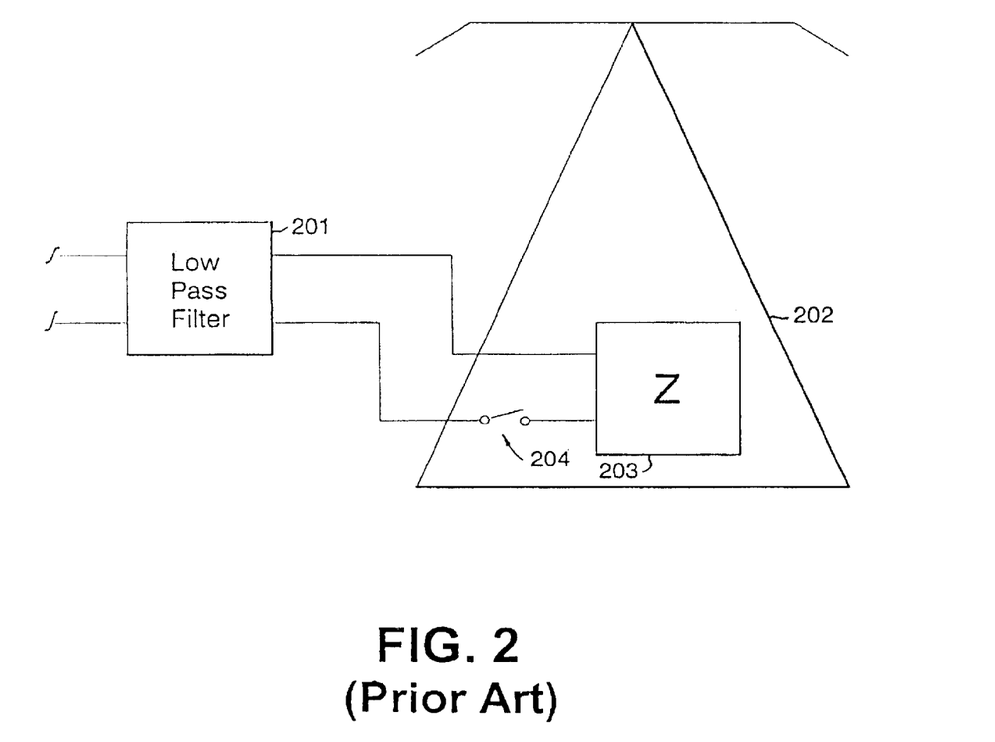
FIG. 2 is a block diagram illustrating a lowpass filter and telephone instrument of the prior art.

FIG. 2 is a block diagram illustrating a lowpass filter and telephone instrument of the prior art. Lowpass filter 201 is coupled to telephone instrument 202. Telephone instrument 202 includes a load 203, which exhibits a load impedance. Load 203 is coupled in series with hookswitch 204. When telephone instrument 202 is off-hook, hookswitch 204 is closed, coupling load 203 to lowpass filter 201. However, when telephone instrument 202 is on-hook, hookswitch 204 is open, disconnecting load 203 from lowpass filter 201. Thus, the electrical characteristics (e.g., the frequency response) of lowpass filter 201 are affected by load 203. Therefore, a circuit is needed to compensate for the undesirable interaction between load 203 and lowpass filter 201.

SUMMARY OF THE INVENTION

The present invention is directed to a method and apparatus for filtering ADSL signals. The filtering technique provided by the invention avoids interference when telephone instruments coupled to a DSL switch between the off-hook and on-hook states. One embodiment of the invention provides a variable inductance in series with a simple lowpass filter used to block high-frequency data communications signals. The variable inductance is controlled by an off-hook detector that senses the status of the telephone instrument hookswitch.

Another embodiment of the invention includes a parallel combination of a resistance element and a switch in series with the DSL to provide attenuation and control the overall electrical characteristics of the filter assembly and telephone instrument. Another embodiment of the invention includes an inductive element with a saturable core in series with the DSL. The saturable character of the inductor core results in the inductive element having different electrical properties depending on whether the telephone instrument is on-hook or off-hook.

Thus, the invention reduces interference to data communications that can otherwise occur in a splitterless ADSL system if a telephone instrument changes hookswitch state.

DETAILED DESCRIPTION OF THE INVENTION

The present invention relates to a method and apparatus for filtering ADSL signals. The filtering technique of the invention avoids interference caused by a telephone instrument changing between on-hook and off-hook states.

In accordance with the present invention, disadvantages and problems associated with lowpass filters in splitterless ADSL have been substantially reduced. One embodiment of a telephone filter for splitterless ADSL in accordance with the present invention includes a lowpass filter, an off-hook detector, an additional attenuator, and one or more switches. The telephone filter in accordance with the present invention changes its input impedance and frequency characteristics as a function of DC current in the telephone line. The lowpass filter is a passive LC circuit that provides the necessary attenuation for ADSL data communications signals, for example, about 50–60 dB for the typically lowest ADSL frequency of 30 kHz.

The off-hook detector according to one embodiment of the invention is an active circuit that senses DC current flow in the telephone line. During the on-hook state, the DC current in a telephone line is very low, for example, about 10 microamperes. In this state, the lowpass filter is connected to the telephone line through an additional attenuator that has a high and determined input impedance over a wide frequency range from 30 Hz to 10 MHz.

While off-hook, a telephone set typically consumes a higher DC current, e.g., 20–70 milliamperes. The off-hook detector of one embodiment of the invention senses this current, activates appropriate switches and connects the lowpass filter to the telephone line. The additional attenuator is disconnected in this situation. During the off-hook state, the telephone filter operates like a lowpass filter that passes a telephone voice communications signal and stops a higher-frequency data communications signal.

While on-hook, a telephone filter configured according to the present invention typically has a high input impedance for telephone voice communications and data communications signals. As a result, a telephone filter loaded by the higher input impedance of an on-hook telephone will not cause distortion to another off-hook telephone.

In accordance with one embodiment of the present invention, the additional attenuator is a resistor that connects in series with the lowpass filter. This: attenuator is shorted by an electronic or mechanical switch. In accordance with another embodiment of present invention, the additional attenuator is a saturated inductance, that is connected in series with the lowpass filter. This attenuator changes its impedance through the action of DC current flowing through the circuit.

Figure 3:
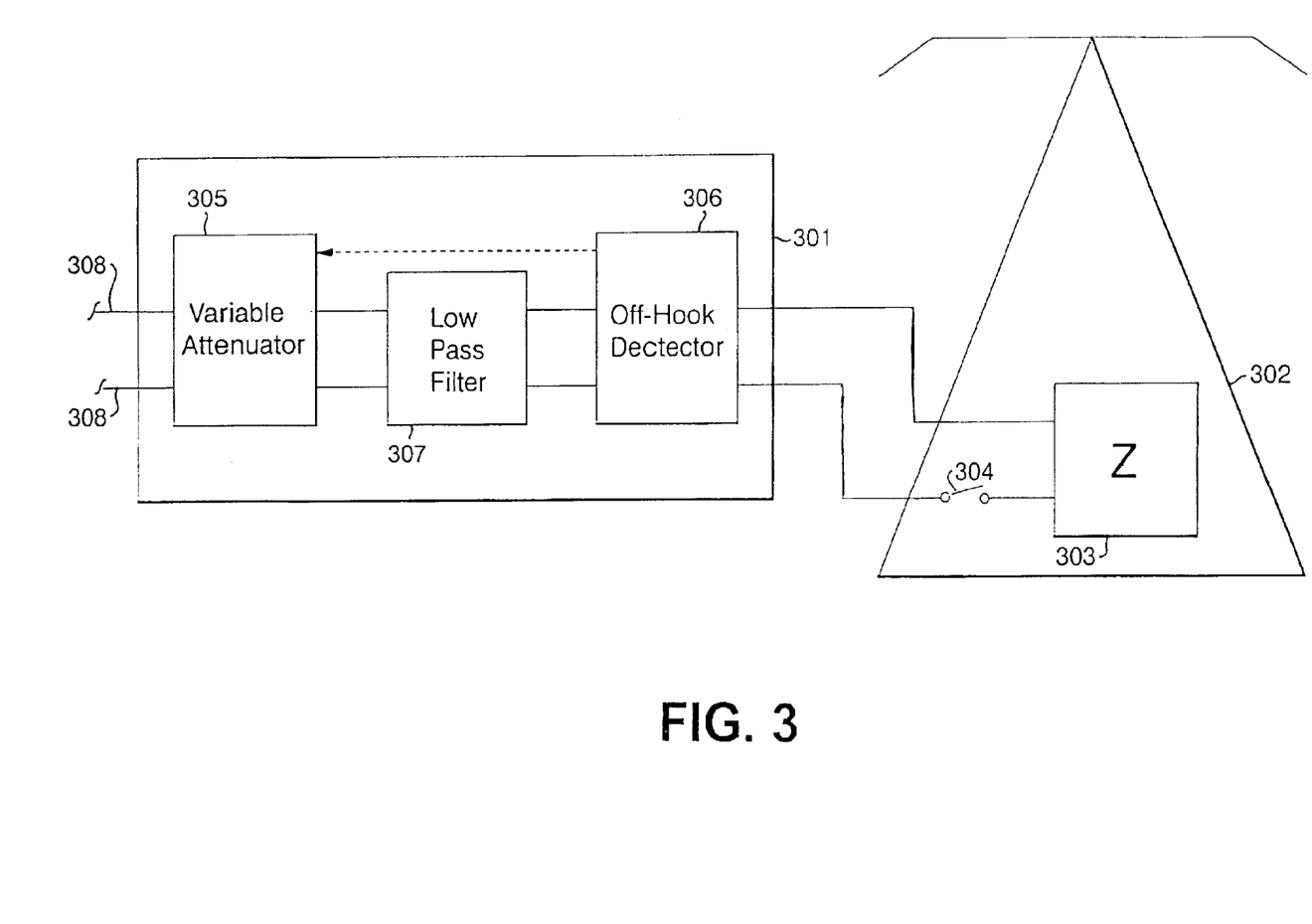
FIG. 3 is a block diagram illustrating one embodiment of the present invention.

FIG. 3 is a block diagram illustrating one embodiment of the present invention. Lowpass filter assembly 301 is coupled to telephone instrument 302. Lowpass filter assembly includes variable attenuator 305, off-hook detector 306, and lowpass filter 307. Telephone instrument 302 includes load 303 and hookswitch 304. Load 303 is coupled in series with hookswitch 304, which is coupled to off-hook detector 306 of lowpass filter assembly 301. Off-hook detector 306 is coupled to lowpass filter 307, which is coupled to variable attenuator 305, which is coupled to DSL 308.

Off-hook detector 306 senses whether hookswitch 304 is in an off-hook or on-hook state. Off-hook detector 306 may detect changes of DSL current to determine the state of hookswitch 304. Off-hook detector 306 senses the current through DSL 308. For example, a low-value resistor may be placed in series with DSL 308 and the voltage across the resistor measured by off-hook detector 306. As another alternative, an optocoupler circuit may be used to sense the current through DSL 308. The level of attenuation provided by variable attenuator 305 may be controlled based on this measurement of current through DSL 308. As yet another alternative, off-hook detector 306 may employ mechanical means or sensors to determine the state of the hookswitch 304.

Off-hook detector 306 need not be located between lowpass filter 307 and hookswitch 304. Rather, off-hook detector 306 may be configured in any manner that provides adequate sensing of the status of hookswitch 304. For example, off-hook detector 306 may be located between lowpass filter 307 and variable attenuator 305 or somewhere along DSL 308 beyond variable attenuator 305.

Figure 4:
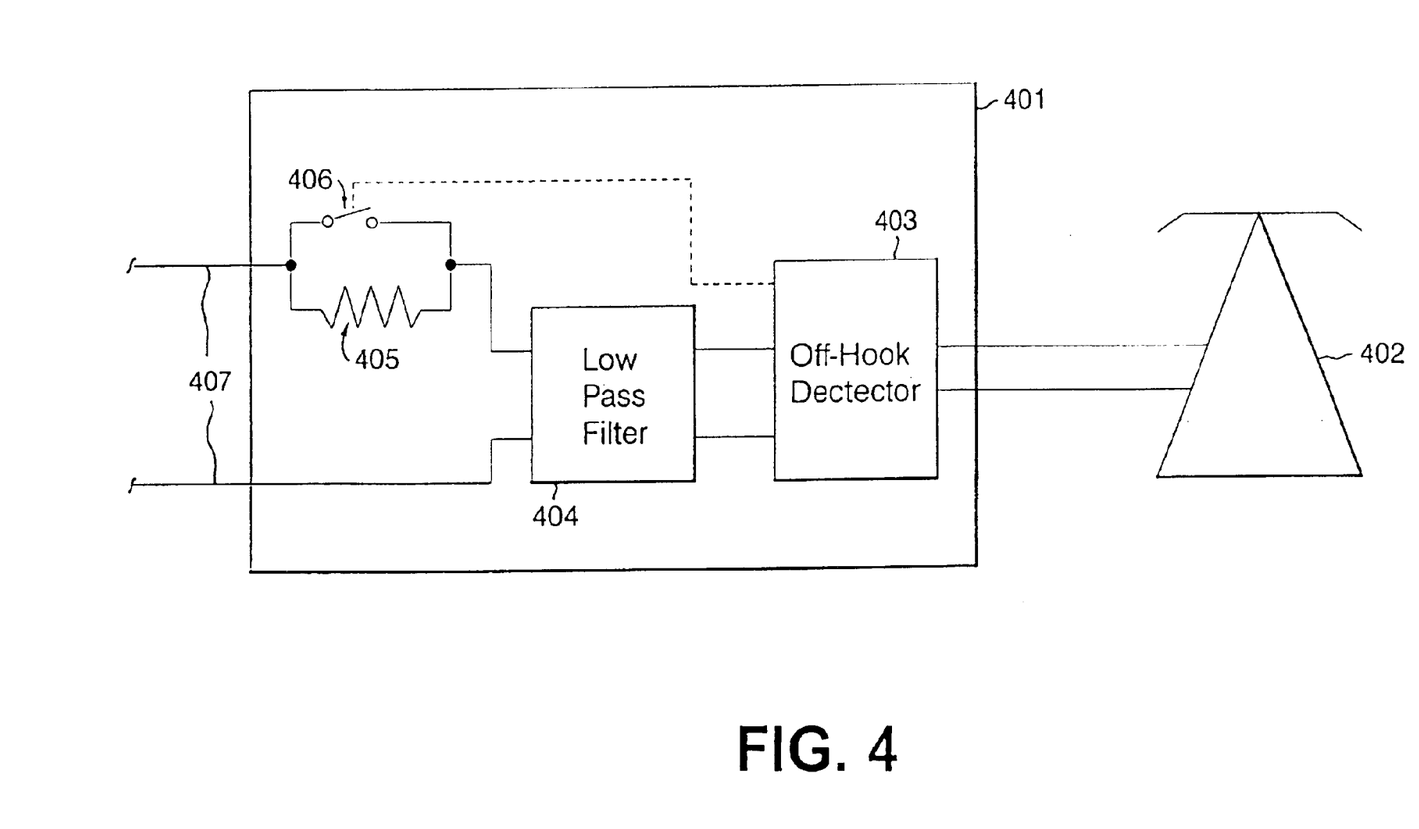
FIG. 4 is a block diagram illustrating one embodiment of the present invention.

FIG. 4 is a block diagram illustrating one embodiment of the present invention. Lowpass filter assembly 401 is coupled to telephone instrument 402. Lowpass filter assembly 401 includes off-hook detector 403, lowpass filter 404, resistance element 405, and switch 406. Off-hook detector 403 is coupled to telephone instrument 402 and lowpass filter 404. Lowpass filter 404 is coupled to the parallel combination of resistance element 405 and switch 406. Resistance element 405 and switch 406 are coupled to DSL 407.

Off-hook detector 403 controls the operation of switch 406. When off-hook detector 403 detects an off-hook state, it causes switch 406 to close. When switch 406 is closed, it shorts resistance element 405, reducing the effective attenuation of DSL 407. When off-hook detector 403 detects an on-hook state, it causes switch 406 to open. When switch 406 is open, it has the effect of electrically inserting resistance element 405 in series with DSL 407. Resistance element 405 serves to attenuate signals present on DSL 407. The increased attenuation provided by resistance element 405 compensates for the effect on lowpass filter 404 from being disconnected from the telephone instrument load by the action of the telephone instrument hookswitch.

Off-hook detector 403 need not be located between lowpass filter 404 and telephone instrument 402. Rather, off-hook detector 403 may be configured in any manner that allows it to detect the status of the telephone instrument hookswitch. For example, off-hook detector 403 may be located between lowpass filter 404 and the parallel combination of resistance element 405 and switch 406 or on DSL 407 somewhere beyond the parallel combination of resistance element 405 and switch 406.

Figure 5:
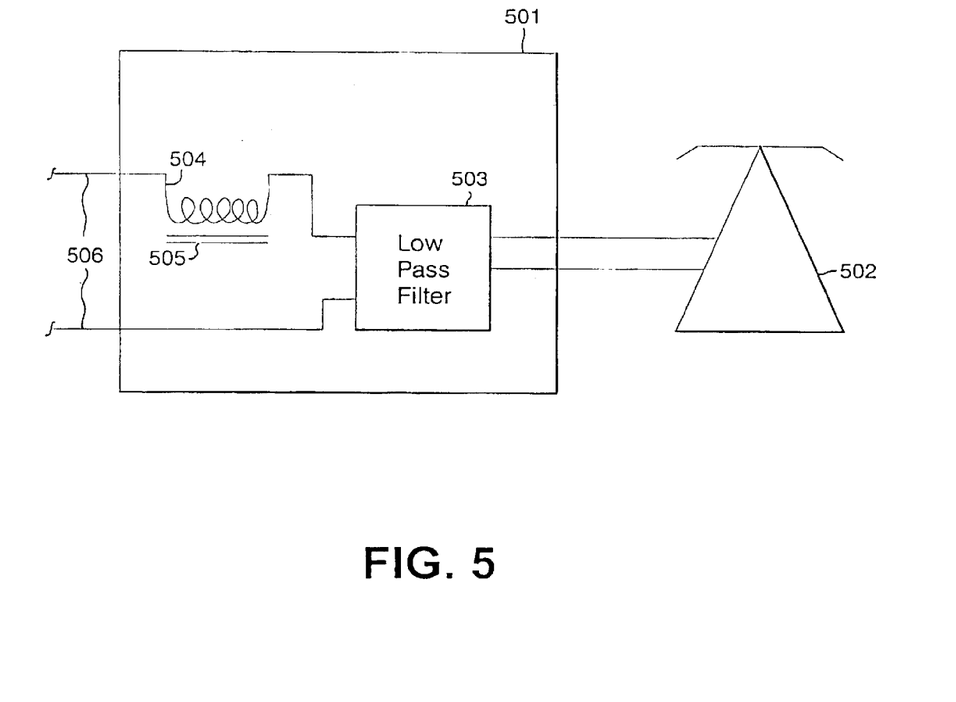
FIG. 5 is a block diagram illustrating one embodiment of the present invention.

FIG. 5 is a block diagram illustrating one embodiment of the present invention. Lowpass filter assembly 501 is coupled to telephone instrument 502. Lowpass filter assembly 501 includes lowpass filter 503 and inductive element 504 with saturable core 505. Inductive element 504 with saturable core 505 is configured in series with DSL 506 and lowpass filter 503.

When telephone instrument 502 is in an on-hook state, negligible current flows through inductive element 504. Thus, saturable core 505 is not saturated, and inductor 504 introduces significant impedance in the circuit, thereby attenuating signals present on DSL 506 and compensating for the influence of the state of telephone instrument 502 on the electrical characteristics of lowpass filter 503.

When telephone instrument 502 is in an off-hook state, significant DC current flows through inductor 504, saturating saturable core 505. When saturable core 505 is saturated, the amount of attenuation it provides is reduced. This reduction in attenuation is offset by the influence of the hookswitch of telephone instrument 502 on the electrical characteristics of lowpass filter 503. By compensating for the changing status of the telephone instrument impedance, inductive element 504 with saturable core 505 avoids interference to data communications occurring on DSL 506.

Figure 6:
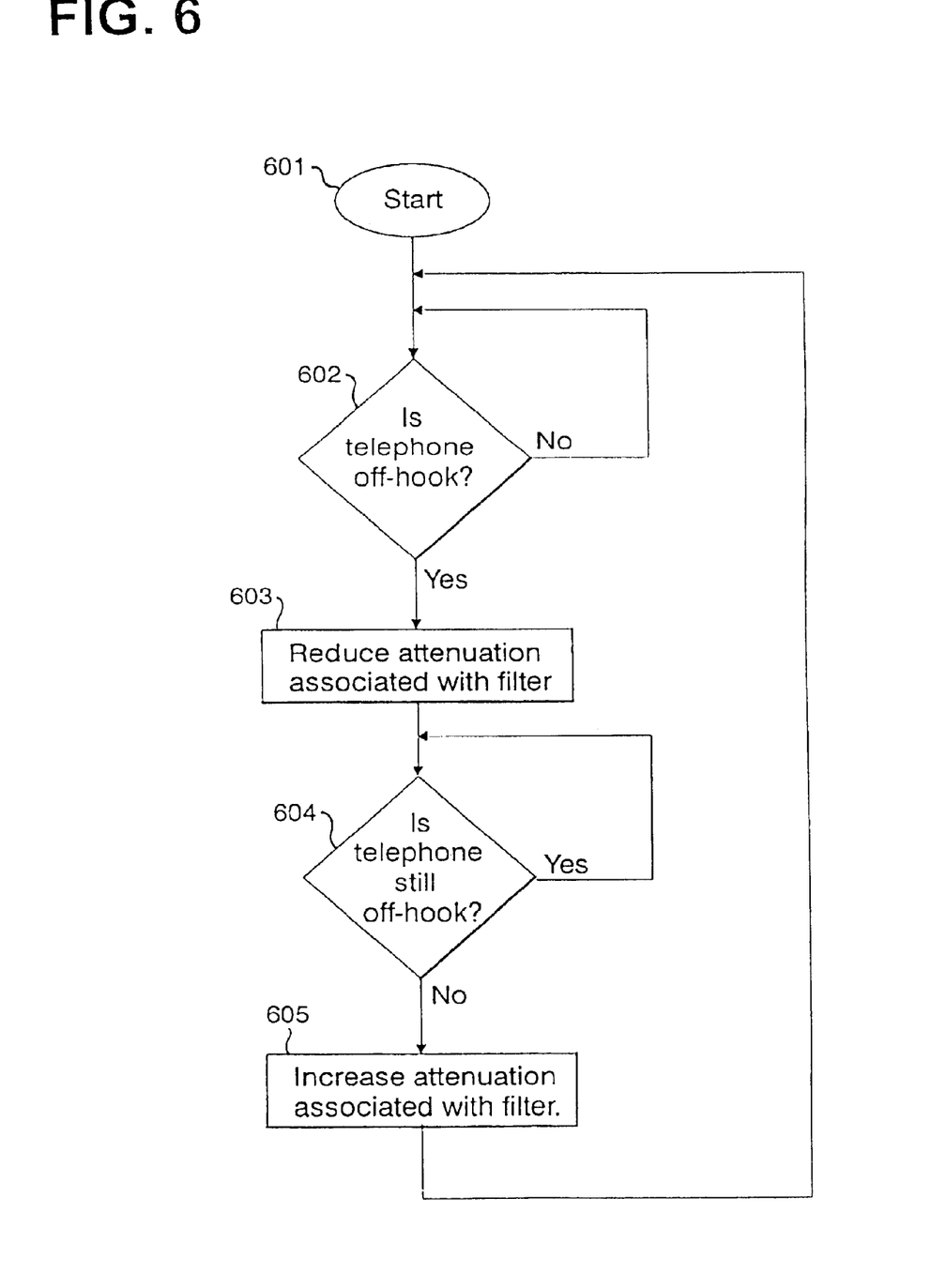
FIG. 6 is a flow diagram illustrating one embodiment of the present invention.

FIG. 6 is a flow diagram illustrating a process according to one embodiment of the present invention. The process begins at step 601. At step 602, a decision is made as to whether or not the telephone instrument is in an off-hook state. If not, the process remains at step 602. However, if the telephone instrument is in an off-hook state, the process proceeds to step 603. In step 603, the attenuation associated with a lowpass filter is reduced. In step 604, a determination is made as to whether or not the telephone instrument is still in the off-hook state. If it is, the process remains at step 604. If not, the process continues to step 605. In step 605, the attenuation associated with the lowpass filter is increased and the process returns to step 602.

Figure 7:
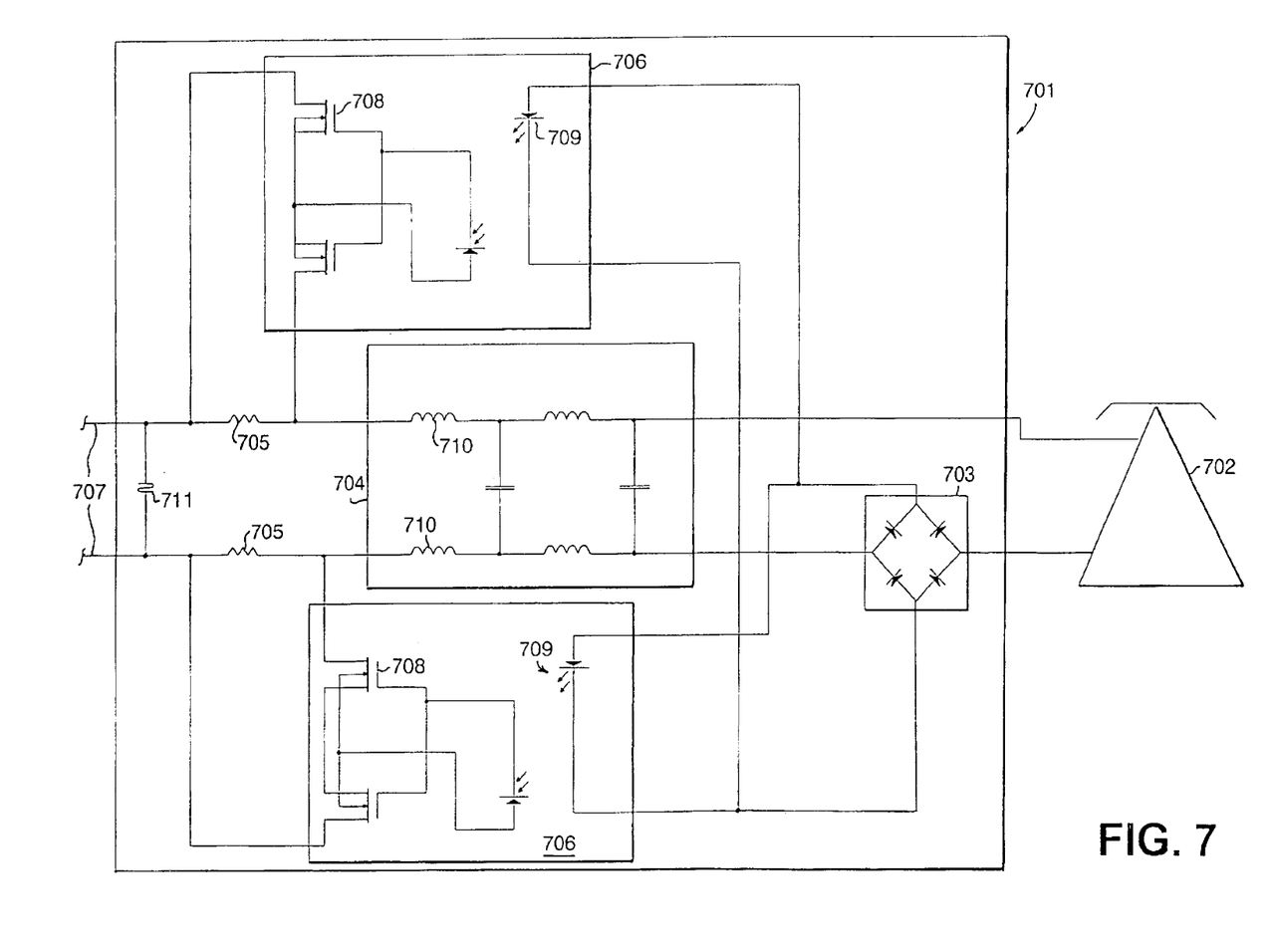
FIG. 7 is a schematic diagram illustrating one embodiment of the invention.

FIG. 7 is a schematic diagram illustrating one embodiment of the invention. Lowpass filter assembly 701 is coupled to telephone instrument 702. Lowpass filter assembly includes off-hook detector 703, low pass filter 704, two resistance elements 705 and two switches 706. Off-hook detector 703 is coupled to the telephone device 702 and lowpass filter 704.

Lowpass filter 704 is coupled to the two parallel combinations of resistance element 705 and switch 706. Two resistive elements 705 and two switches 706 are coupled to DSL 707. Protection device 711 is connected to the input of lowpass filter assembly 701 for lighting protection. The switches 706 are implemented by optoMOS relay 708. This relay 708 has low on resistance, for example about 15 ohms and very high off impedance, for example about several megohms. Input light emitting diode (LED) 709 of optorelay 708 is very sensitive. Its turn-on input current is as small as 0.5 milliamperes, for example. Off-hook detector 703 is a simple Schottky diode bridge 710 that is connected in series, for example, into one wire of the twisted pair DSL 707.

When the telephone 702 is on-hook, the current that flows through photo diodes 709 is very small, for example about 10 microamperes, and optorelays 708 are off. In this state, the impedance of the lowpass filter assembly 701 is high, for example, about 3 kiloohms, because of the resistive elements 705.

During the off-hook state of telephone instrument 702, independently of the polarity of the TIP and RING terminals, a current of about 20–50 milliamperes flows through both LED's 709. This current switches optorelays 708 to the on state. Optorelays 708 short resistance elements 705 and change the impedance of the lowpass filter assembly 701 to a nominal 600 ohms in the voice frequency range. In the high frequency range of ADSL, the lowpass filter assembly 701 has high impedance during both off-hook and on-hook states of the telephone instrument 702. In the on-hook state of the telephone instrument 702, resistive elements 705 contribute to the high impedance of the lowpass filter assembly 701 because optorelays 708 have very low capacitance, for example about 10 picofarads, between their inputs and outputs. In both the on-hook and off-hook states of the telephone instrument 702, lowpass filter 704 contributes to the high impedance of the lowpass filter assembly 701 because lowpass filter 704 includes input inductance 710 connected in series with DSL 707.

One advantage of this embodiment of this invention is the high breakdown voltage of optorelays 708, for example about 400 VDC between output pins and more than 3 KV between input and output. This makes it possible to use this lowpass filter assembly 701 for a home telephone network or other telephone or communication network in accordance with existing standards.

Figure 8:
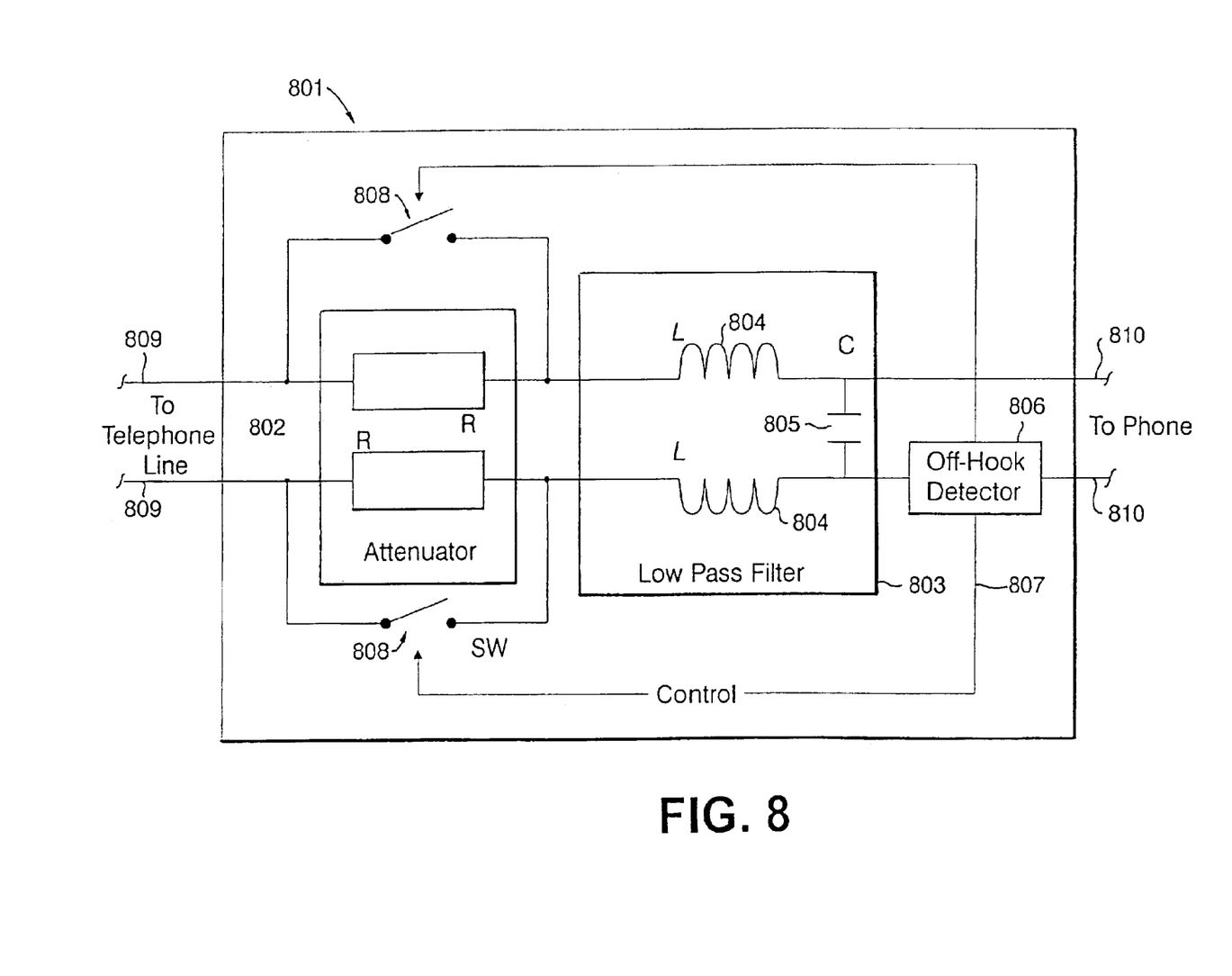
FIG. 8 is a schematic diagram illustrating one embodiment of the invention.

FIG. 8 is a schematic diagram illustrating one embodiment of the invention. Inline filter 801 comprises attenuator 802, lowpass filter 803, off-hook detector 806, and switches 808. Attenuator 802 is coupled to telephone line 809, which preferably comprises two conductors, and to lowpass filter 803. Switches 808 are also coupled to telephone line 809 and to lowpass filter 803. Lowpass filter 803 comprises inductors 804 and capacitor 805, with one of inductors 804 configured in series with each conductor of telephone line 809 as it extends through inline filter 801. Capacitor 805 is configured in parallel with the conductors. Alternatively, other types of lowpass filters may be used to provide lowpass filter 803. Off-hook detector 806 is coupled to lowpass filter 803 and to line 810, which comprises two conductors and is coupled to telephone equipment, such as a telephone instrument or other station equipment. Line 810 preferably comprises two conductors. Off-hook detector 806 provides control outputs 807 to switches 808.

When the telephone equipment coupled to line 810 is on-hook, off-hook detector 806 detects the on-hook state and provides the appropriate signals on control outputs 807 to switches 808, causing switches 808 to open. With switches 808 open, attenuator 802 is effectively inserted into the circuit between telephone line 809 and lowpass filter 803. Attenuator 802 comprises attenuation elements coupled to each conductor of telephone line 809. For example, these attenuation elements may be resistors or other impedance elements, preferably impedance elements exhibiting a relatively high resistance component as compared with their reactance components.

When the telephone equipment coupled to line 810 is off-hook, off-hook detector 806 detects the off-hook state and provides the appropriate control signals on control outputs 807 to switches 808, causing switches 808 to close. With switches 808 closed, switches 808 short out the attenuation elements of attenuator 802. Thus, by closing switches 808, attenuator 802 is effectively removed from the circuit between telephone line 809 and lowpass filter 803.

Thus, the circuit of FIG. 8 automatically controls attenuator 802 and switches 808 to provide compensation for the performance of lowpass filter 803 when the impedance of telephone equipment coupled to line 810 changes in transition between on-hook and off-hook states.

Figure 9:
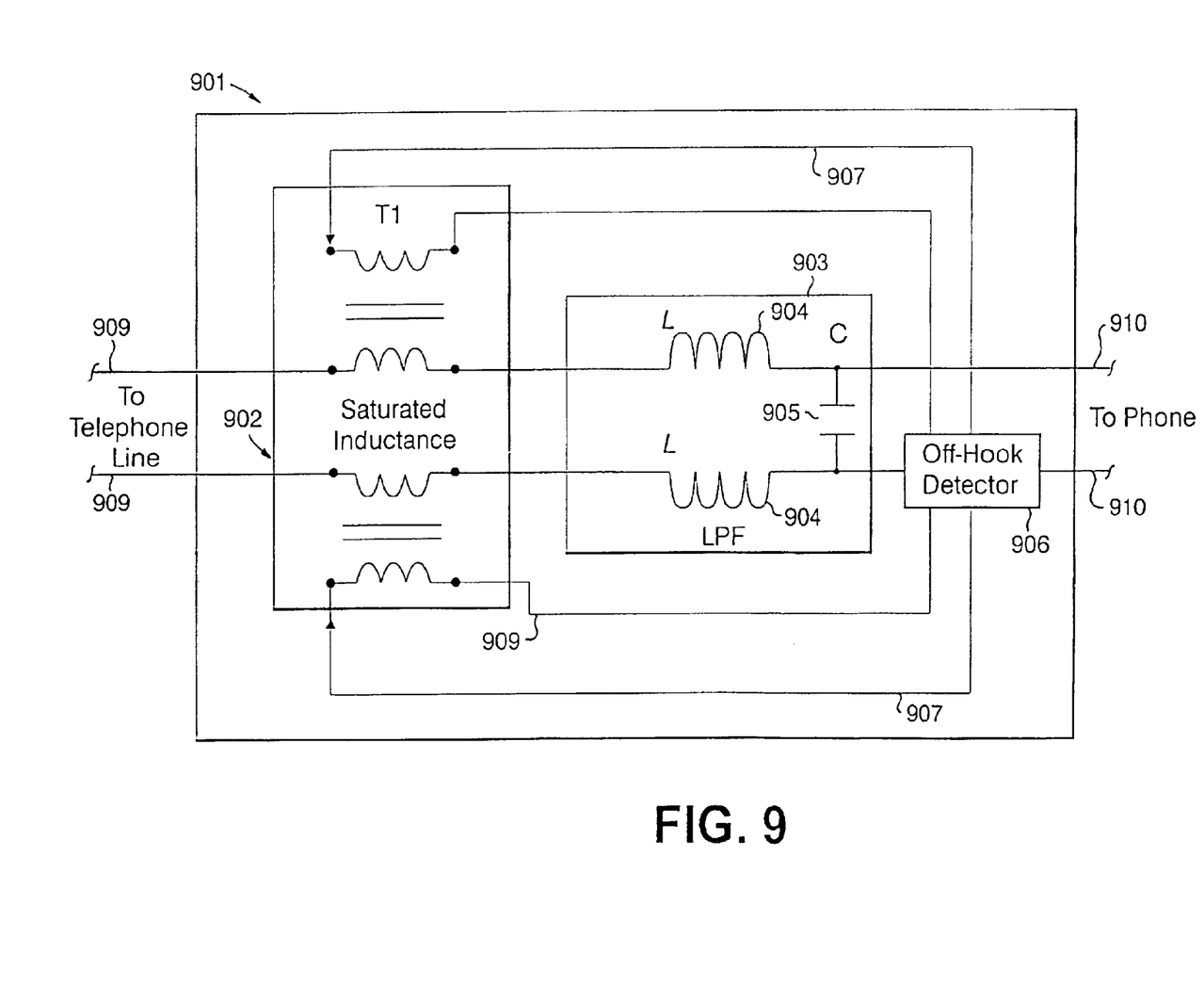
FIG. 9 is a schematic diagram illustrating one embodiment of the invention.

FIG. 9 is a schematic diagram illustrating one embodiment of the invention. Inline filter 901 comprises attenuator 902, lowpass filter 903, and off-hook detector 906. Attenuator 902 is coupled to telephone line 909, which preferably comprises two conductors, and to lowpass filter 903. Attenuator 902 comprises a saturable inductance element or other impedance element exhibiting substantial inductive reactance in series with each conductor of telephone line 909.

Lowpass filter 903 comprises inductors 904 and capacitor 905, with one inductor configured in series with each conductor of telephone line 909 as it extends through inline filter 901. Alternatively, other types of lowpass filters may be used to provide lowpass filter 903. Capacitor 905 is configured in parallel with the conductors.

Off-hook detector 906 is coupled to lowpass filter 903 and to telephone equipment, such as a telephone instrument or other station equipment coupled to line 910. Line 910 preferably comprises two conductors. Off-hook detector 906 provides control outputs 907 to attenuator 902.

When the telephone equipment coupled to line 910 is in an on-hook state, off-hook detector 906 provides signals to attenuator 902 to prevent current from flowing through secondary windings of the saturable inductive elements, such as saturable core inductors or saturable core transformers. Without this current flowing, the saturable inductive elements of attenuator 902 effectively insert a substantial impedance in series with lowpass filter 903. This inductance works in conjunction with the elements of lowpass filter 903 to change the characteristics of lowpass filter 903 to compensate for the higher on-hook impedance of the telephone equipment coupled to line 910.

When the telephone equipment coupled to line 910 is in an off-hook state, off-hook detector 906 provides signals to attenuator 902 to cause current to flow through the secondary windings of the saturable inductive elements. When current flows through the secondary windings of the saturable inductive elements of attenuator 902, the saturable inductive elements become saturated with magnetic flux, thereby effectively reducing the inductance of the primary windings of the saturable inductive elements. With the impedance of the primary windings reduced, lowpass filter 903 provides the appropriate frequency response in conjunction with the impedance of the telephone equipment coupled to line 910.

Thus, the circuit of FIG. 9 provides automatic adjustment of the characteristics of lowpass filter 903 to compensate for changes in impedance of telephone equipment coupled to line 910 when the telephone equipment switches between the on-hook and off-hook states.

Figure 10:
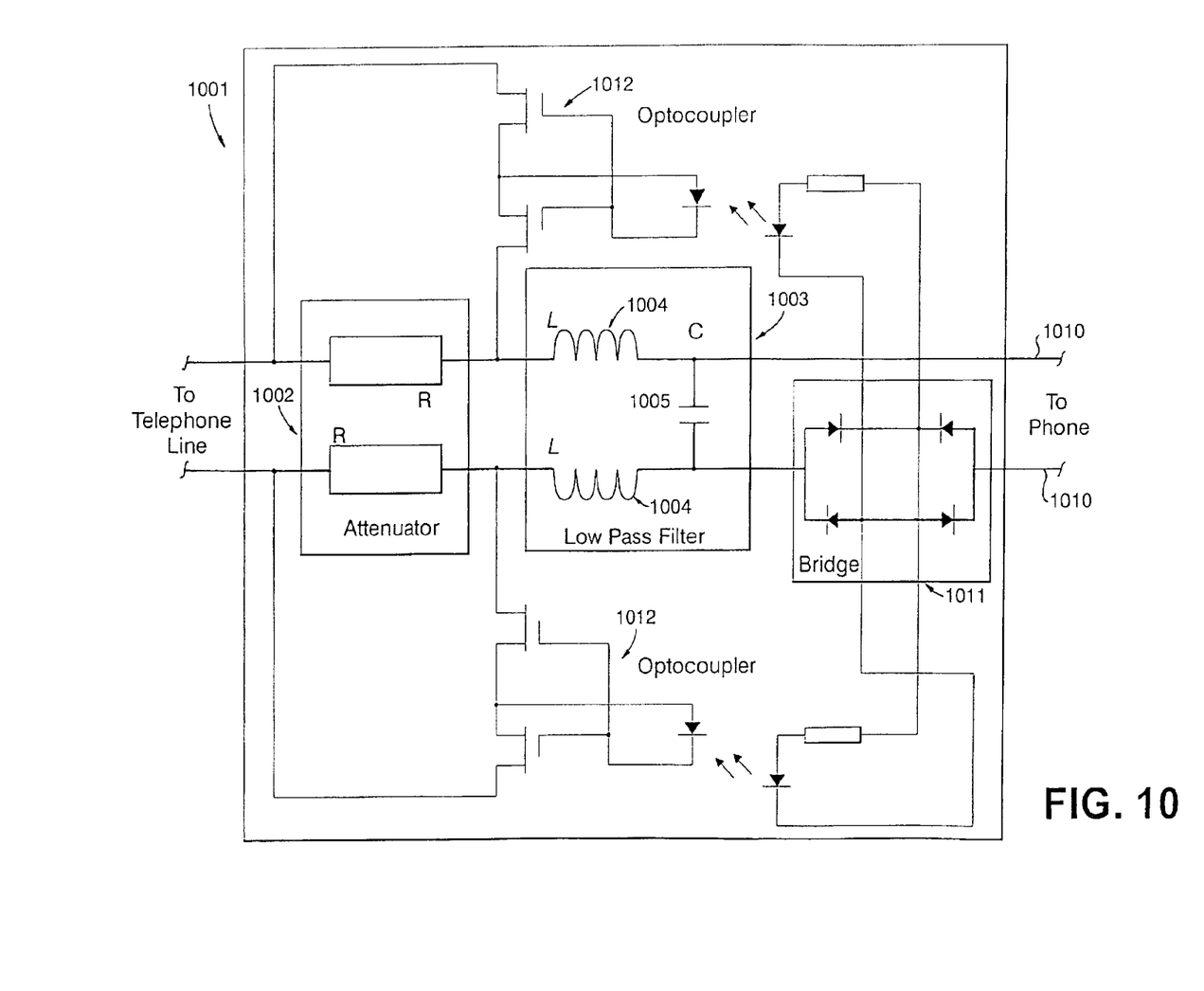
FIG. 10 is a schematic diagram illustrating one embodiment of the invention.

FIG. 10 is a schematic diagram illustrating one embodiment of the invention. Inline filter 1001 comprises attenuator 1002, lowpass filter 1003, diode bridge 1011, and optocouplers 1012. Attenuator 1002 is coupled to telephone line 1009 and to lowpass filter 1003.

Diode bridge 1011 is coupled to lowpass filter 1003 and to telephone equipment, such as a telephone instrument or other station equipment, connected to line 1010. Line 1010 preferably comprises two conductors. Diode bridge 1011 comprises four diodes, preferably Schottky diodes or other diodes having low forward voltage ratings. The diodes are configured such that two diodes, one of each polarity orientation, are coupled to lowpass filter 1003 and two diodes, one of each polarity orientation, are coupled to one conductor of line 1010. The remaining terminals of these four diodes are coupled anode-to-anode and cathode-to-cathode to form two nodes at which control outputs are provided to the LED or input portions of optocouplers 1012. Additional components, for example current limiting resistors may be provided in series with the LED or input portions of optocouplers 1012.

When the telephone equipment coupled to line 1010 is in the off-hook state, current flows through line 1010 and, therefore, through diode bridge 1011. Thus, diode bridge 1011 causes current to flow through the LED or input portions of optocouplers 1012. The LED or input portions of optocouplers 1012 provide an optical signal to the photodiode portions of optocouplers 1012. The photodiode portions of optocouplers 1012 are coupled to MOSFET switches of optocouplers 1012. The MOSFET switches close when optical signals are received at the photodiodes portions of optocouplers 1012. Examples of optocouplers 1012 with which the invention may be practiced include optoMOS relays and other optoelectronic devices.

Attenuator 1002 comprises attenuation elements, for example resistors or other impedance elements. When the MOSFET switches of optocouplers 1012 close, they short out the attenuation elements of attenuator 1002, thereby effectively removing the attenuation of attenuator 1002 from the circuit.

When telephone equipment coupled to line 1010 is placed in an on-hook state, current stops flowing through line 1010 and through diode bridge 1011. Thus, current stops flowing through the LED or input portions of optocouplers 1012. Consequently, the LED or input portions of optocouplers 1012 stop emitting optical energy. When no optical energy is received by the photodiode portions of optocouplers 1012, the MOSFET switches of optocouplers 1012 stop conducting and, therefore, stop shorting out attenuator 1002. As a result, attenuator 1002 is effectively inserted in the circuit.

Lowpass filter 1003 preferably comprises inductors 1004 and capacitor 1005, with one inductor 1004 configured in series with each conductor of telephone line 1009 as it extends through inline filter 1001 and with capacitor 1005 configured in parallel across the conductors. When attenuator 1002 is effectively inserted in the circuit, the characteristics of lowpass filter 1003 are adjusted to compensate for the difference in impedance of the telephone equipment between the on-hook state and the off-hook state.

While this invention is useful in an ADSL context, it may also be practiced with other types of communications lines, especially communication lines where additional signals are frequency division multiplexed at higher frequencies over low-frequency signals. For example, to avoid the need to install additional wiring in a location such as a home or office, additional signals, such as data signals, may be multiplexed at higher frequencies over existing telephone wiring. The invention may be applied to prevent interference to telephone equipment from the new signals. In areas where telephone cable plant facilities are scarce, an added main line (AML) system may be used to multiplex a virtual second telephone line on the same physical telephone line. The present invention may be applied to prevent interference between the AML system and the existing telephone equipment. In general, the invention may be applied to any type of network or wiring where filtering is to occur in the presence of dynamic electrical characteristics.

What is claimed is:

1. A circuit for use with telephone equipment comprising:
   an attenuator coupled to a communication line;
   a lowpass filter coupled to said attenuator;
   an off-hook detector coupled to said attenuator;
   said attenuator comprising an impedance element, wherein said impedance element includes an inductive element;
   a switch coupled to said impedance element;
   said switch controlled by said off-hook detector; and
   said switch comprising an optically-coupled MOSFET device.

2. The circuit of claim 1 wherein said inductive element is a saturable inductive element.

3. A circuit for use with telephone equipment comprising;
   an attenuator coupled to a communication line;
   a lowpass filter coupled to said attenuator;
   an off-hook detector coupled to said attenuator; said attenuator comprising a saturable inductive impedance element;
   a switch coupled to said impedance element; and
   said switch controlled by said off-hook detector.

4. The circuit of claim 3 wherein said switch is coupled in parallel with said impedance element.

5. The circuit of claim 3 wherein said off-hook detector comprises a diode bridge.

6. A method of filtering low-frequency inter-modulation distortion telephone signals for use in a splitterless ADSL system comprising a plurality of telephone instruments which are each coupled via respective lowpass filters to a central office by a digital subscriber line (DSL), wherein each lowpass filter assembly includes an off-hook detector, a lowpass filter coupled in series to said off-hook detector, and a variable attenuator coupled in series to said lowpass filter, said method comprising the following steps:
   determining a hookswitch condition of at least one telephone instrument; and
   altering an attenuation characteristic of the variable attenuator of the respective lowpass filter of said at least one telephone instrument; and
   said altering step being performed based on said hookswitch condition and comprises the step of switching a switch which is in parallel with an impedance element of the variable attenuator;
   wherein the impedance element is connected in series with the telephone instrument, and said impedance element is a saturable inductive element.

* * * * *

UNITED STATES PATENT AND TRADEMARK OFFICE
CERTIFICATE OF CORRECTION

PATENT NO. : 6,813,343 B1
DATED : November 2, 2004
INVENTOR(S) : Roman Vitenberg It is certified that error appears in the above-identified patent and that said Letters Patent is hereby corrected as shown below:

Title page,
Item [73], Assignee, delete "Orckitt Communications Ltd.," and substitute -- Orckit Communications Ltd. --.

Signed and Sealed this

First Day of March, 2005

JON W. DUDAS
*Director of the United States Patent and Trademark Office*